(12) United States Patent
Ehrhard et al.

(10) Patent No.: US 10,774,732 B2
(45) Date of Patent: Sep. 15, 2020

(54) EXHAUST-GAS TURBOCHARGER WITH ADJUSTABLE TURBINE GEOMETRY

(71) Applicant: CONTINENTAL AUTOMOTIVE GMBH, Hannover (DE)

(72) Inventors: Jan Ehrhard, Wiesloch (DE); Ralf Böning, Reiffelbach (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 229 days.

(21) Appl. No.: 15/857,684

(22) Filed: Dec. 29, 2017

(65) Prior Publication Data
US 2018/0119609 A1 May 3, 2018

Related U.S. Application Data

(63) Continuation of application No. PCT/EP2016/063752, filed on Jun. 15, 2016.

(30) Foreign Application Priority Data

Jul. 8, 2015 (DE) .................. 10 2015 212 808

(51) Int. Cl.
*F02B 37/24* (2006.01)
*F02B 37/00* (2006.01)
(Continued)

(52) U.S. Cl.
CPC ............ *F02B 37/24* (2013.01); *F01D 17/165* (2013.01); *F02B 37/004* (2013.01); *F02C 6/12* (2013.01); *Y02T 10/144* (2013.01)

(58) Field of Classification Search
CPC ........ F02B 37/24; F02B 37/004; F02B 37/18; F02B 37/183; F02B 37/186; F01D 17/16; F01D 17/162; F01D 9/04; F02C 6/12
(Continued)

(56) References Cited

U.S. PATENT DOCUMENTS 2,860,827 A * 11/1958 Egli ...................... F01D 17/165
415/164
3,029,067 A * 4/1962 Parker .................. F01D 17/165
415/163
(Continued)

FOREIGN PATENT DOCUMENTS

DE 4218229 C1 3/1993
DE 10009099 A1 8/2001
(Continued)

OTHER PUBLICATIONS

Machine Translation to Hollweck (Pub. No. EP 1 128 025 A2, published on Aug. 29, 2001.*
(Continued)

*Primary Examiner* — Thai Ba Trieu

(57) ABSTRACT

An exhaust-gas turbocharger for an internal combustion engine includes an intake duct for air, an exhaust-gas duct, a turbine arranged in the exhaust-gas duct, and a compressor impeller arranged in the intake duct, which turbine and compressor impeller are both arranged on a common shaft, wherein the exhaust-gas duct has a spiral housing which coaxially surrounds the turbine, and wherein, between the spiral housing and the turbine, a ring-shaped gap is provided through which the exhaust-gas flow flows circumferentially to the turbine, and wherein, in the ring-shaped gap, guide vanes are arranged which are rotatable about an adjustment axis by an adjustment mechanism for controlling the flow resistance. To compensate thermal expansions and shrinkages of the guide vanes under different operating conditions, the adjustment mechanism additionally has a displacement mechanism for displacing the guide vanes in the ring-shaped gap. The displacement mechanism is directly coupled to the adjustment mechanism.

18 Claims, 5 Drawing Sheets

(51) Int. Cl.
*F01D 17/16* (2006.01)
*F02C 6/12* (2006.01)

(58) Field of Classification Search
USPC .......... 60/602, 598; 415/148, 158, 160, 163, 415/164, 208.3, 208.4
See application file for complete search history.

(56) References Cited

U.S. PATENT DOCUMENTS

| | | | | |
|---|---|---|---|---|
| 3,957,392 | A * | 5/1976 | Blackburn | F04D 29/462 415/146 |
| 4,324,526 | A * | 4/1982 | Berchtold | F01D 17/167 415/147 |
| 4,770,605 | A * | 9/1988 | Nakatomi | F04D 29/462 415/148 |
| 5,452,986 | A | 9/1995 | Osborne et al. | |
| 6,312,217 | B1 * | 11/2001 | Takahashi | F01D 17/165 415/160 |
| 6,652,224 | B2 * | 11/2003 | Mulloy | F01D 17/167 415/158 |
| 6,820,333 | B2 * | 11/2004 | Shimmei | F04D 29/2261 29/401.1 |
| 7,628,580 | B2 * | 12/2009 | Parker | F01D 17/165 415/164 |
| 7,930,888 | B2 * | 4/2011 | Parker | F01D 17/167 415/158 |
| 8,172,517 | B2 * | 5/2012 | Lighty | F01D 17/162 415/156 |
| 8,328,535 | B2 * | 12/2012 | Anschel | F01D 17/165 415/208.4 |
| 8,601,812 | B2 * | 12/2013 | Parker | F01D 17/167 415/158 |
| 10,006,341 | B2 * | 6/2018 | Annati | F04D 17/06 |
| 10,066,639 | B2 * | 9/2018 | Annati | F04D 17/06 |
| 2001/0053325 | A1 * | 12/2001 | Jinnai | F01D 17/165 415/209.3 |
| 2010/0293942 | A1 * | 11/2010 | Martinez-Botas | F01D 17/165 60/602 |
| 2011/0206500 | A1 * | 8/2011 | Nagao | F01D 17/165 415/148 |
| 2012/0243973 | A1 | 9/2012 | Kierat | |
| 2014/0341729 | A1 * | 11/2014 | Osako | F01D 17/165 415/208.1 |
| 2015/0330293 | A1 * | 11/2015 | Yokoyama | F01D 17/16 415/148 |

FOREIGN PATENT DOCUMENTS

| | | | |
|---|---|---|---|
| DE | 69527582 | T2 | 11/2002 |
| DE | 102009004890 | A1 | 7/2010 |
| EP | 1128025 | A2 | 8/2001 |
| EP | 1353040 | A2 | 10/2003 |
| EP | 2233718 | A1 | 9/2010 |
| JP | 56066498 | A * | 6/1981 .......... F02D 29/462 |
| JP | 01208501 | A * | 8/1989 |
| WO | 9519499 | A2 | 7/1995 |

OTHER PUBLICATIONS

International Search Report and Written Opinion dated Sep. 14, 2016 from corresponding International Patent Application No. PCT/EP2015/063752.
German Search Report dated Apr. 26, 2016 for corresponding German Patent Application No. 10 2015 212 808.3.
Chinese Office Action dated Aug. 14, 2019 for corresponding Chinese Patent Application No. 201680039994.5.
Indian Examination Report dated Jul. 5, 2019 for corresponding Indian Patent Application No. 201737042924.
German Office Action dated Jun. 2, 2020 for corresponding German Patent Application No. 10 2015 212 808.3.
Brazilian Examination first Office Action dated Jun. 15, 2020 for corresponding Brazilian Patent Application No. 112017025775-0.

* cited by examiner

EXHAUST-GAS TURBOCHARGER WITH ADJUSTABLE TURBINE GEOMETRY

CROSS REFERENCE TO RELATED APPLICATIONS

This application claims the benefit of International application No. PCT/EP2016/063752, filed Jun. 15, 2016, which claims priority to German patent application No. 10 2015 212 808.3 filed Jul. 8, 2015, each of which is hereby incorporated by reference.

FIELD OF INVENTION

The invention lies in the field of mechanical engineering and can be used particularly advantageously in the automotive engineering sector. It relates in particular to exhaust-gas turbochargers with adjustable turbine geometry.

BACKGROUND

For an increase in power, and for resource-conserving and environmentally friendly operation of internal combustion engines, use has long been made of exhaust-gas turbochargers which permit pre-compression of the air taken in by the internal combustion engine. Normally, such exhaust-gas turbochargers have, in the exhaust-gas flow of the internal combustion engine, a turbine which is connected by means of a shaft to a compressor impeller in the intake duct.

Efficient operation of the turbine on the exhaust-gas side requires different settings of the gas guidance in the turbine under changing operating conditions of the internal combustion engine. Wastegate valves, for example, are known for this purpose.

In the case of diesel engines, but increasingly also in the case of Otto-cycle engines, use is furthermore often made of adjustable turbine geometries. These provide adjustable guide vanes which are arranged upstream of the turbine impeller. The guide vanes are arranged in a movable and adjustable manner and within a ring-shaped gap around the turbine.

Since, with changing operating conditions, it is the case in particular that the temperature of the exhaust-gas flow changes, the guide vanes are also subject to thermal changes, in particular thermal contraction and expansion in the event of temperature changes. This gives rise to particular problems in conjunction with the fact that, in the case of reduced dimensions of the guide vanes, gaps form in relation to the walls of the ring-shaped gap, as a result of which the efficiency of the turbine as a whole is decreased.

The detrimental effect of such gaps or of an inadequately defined ring-shaped gap geometry has already been recognized, and is the subject of the US patent application US 2012/0243973 A1. Said document describes guide vanes which are mounted on a holding ring so as to be pivotable about a pivot axis and which are each connected to actuation levers. The actuation levers are pivotable and are preloaded in a direction parallel to the pivot axis by an oblique actuation surface in order to compensate any existing mechanical play and in order to realize defined positions of the guide vanes.

SUMMARY

Against the background of the prior art, it is the object of the present invention to specify an exhaust-gas turbocharger of the above-stated type, in the case of which inefficiencies of the exhaust-gas guidance are reduced to the greatest possible extent.

The invention thus relates to an exhaust-gas turbocharger for an internal combustion engine having an intake duct for air and having an exhaust-gas duct and having a turbine arranged in the exhaust-gas duct and a compressor impeller arranged in the intake duct, which turbine and compressor impeller are both arranged on a common shaft, wherein the exhaust-gas duct has a spiral housing which coaxially surrounds the turbine, and wherein, between the spiral housing and the turbine, there is provided a ring-shaped gap through which the exhaust-gas flow flows circumferentially to the turbine, and wherein, in the ring-shaped gap, there are arranged guide vanes which are rotatable about an adjustment axis by means of an adjustment mechanism for the purposes of controlling the flow resistance.

It is furthermore provided that the adjustment mechanism of the guide vanes additionally has a displacement mechanism for the displacement of the guide vanes in the ring-shaped gap. By means of the displacement mechanism, the position of the guide vanes is adjustable not only with regard to the adjustment angle but also with regard to their position in the ring-shaped gap. By means of a translational movement of the guide vanes, a guide-vane gap between the respective guide vane and delimiting walls of the ring-shaped gap may be optimized or improved.

An advantageous refinement provides that the ring-shaped gap is delimited at least in sections by two walls, wherein the guide vanes are mounted, so as to be rotatable about the adjustment axes, in a first of the walls and form in each case one guide-vane gap with the other, second wall, which gap may be adjusted by actuation of the displacement mechanism.

It may furthermore advantageously be provided that each displacement mechanism is mechanically coupled to the adjustment mechanism.

Normally, the adjustment angle of the guide vanes and thus the flow resistance of the exhaust-gas flow diverting device composed of all of the guide vanes, or in other words the flow resistance in the ring-shaped gap, is set in a manner dependent on the exhaust-gas flow, that is to say the of exhaust-gas flow quantity flowing out through the exhaust-gas duct per unit of time. Said exhaust-gas flow is dependent on the operation of the internal combustion engine and is particularly great if the power of the internal combustion engine is high and thus also the temperature of the exhaust gas is high.

Since, in this way, coupling exists between the flow rate or flow speed of the exhaust-gas flow and the temperature thereof, it is expedient for the diversion of the exhaust-gas flow to the turbine by means of the guide vanes to also be coupled to a measure which controls the position of the guide vanes in the exhaust-gas flow, in a manner dependent on the exhaust-gas temperature, such that the thermal expansion and shrinkage is allowed for. It is thus possible, in the case of coupling of the adjustment mechanism of the guide vanes to the displacement mechanism, for both the fluid mechanical aspect, by means of suitable impingement of flow on the turbine, and also the reaction to the thermal changes and the deformation of the guide vanes as a result of expansion to be connected to one another. If the exhaust-gas flow rate falls, the flow duct to the turbine is normally opened wider, that is to say the guide vanes are moved into an opened position. At the same time, the temperature of the guide vanes falls, such that these thermally shrink. The resulting enlargement of the gap in relation to a wall of the ring-shaped gap is compensated by means of the displacement mechanism, that is to say in particular the displacement of the respective guide vane toward a wall of the ring-shaped gap. For this purpose, it is possible for the adjustment mechanism of each individual guide vane to be coupled to a displacement mechanism of the same guide vane.

If the adjustment mechanism and the displacement mechanism are not coupled to one another, they must be actuated individually and separately from one another. Various mechanisms for the actuation of the adjustment device are already known, for example from the abovementioned US 2012/0243973 A1. A mechanical displacement of the guide vanes may then be provided independently thereof, and actuated by external means.

If the adjustment mechanism and the displacement mechanism are coupled to one another, it may for example be provided that each displacement mechanism effects a displacement of the guide vanes transversely, in particular perpendicularly, to the flow direction of the exhaust-gas flow in the ring-shaped gap.

For this purpose, it may for example be provided that each adjustment mechanism is connected to a conversion device for converting a rotational movement of each guide vane, or of an adjustment shaft connected thereto, about the adjustment axis into a sliding movement in the direction of the adjustment axis, that is to say parallel to the adjustment axis.

As a conversion device, basically any type of mechanical mechanism is conceivable which enables a drive action for the displacement mechanism of the guide vanes to be derived from the rotational movement of the guide vanes.

For this purpose, it may for example be provided that each conversion device has two elements in the form of firstly an oblique plane and secondly a counterpart body which slides on the oblique plane during the course of the rotational movement, wherein one of said elements is fastened to the first wall, and the second element is fastened to the adjustment shaft or to the guide vane. For example, an oblique plane in the form of a wedge body may be provided on the first wall or on the adjustment shaft or the guide vane, and a wedge body with an oblique plane may likewise be provided as a counterpart element. However, a design may also be selected in which a single wedge surface interacts with a straight surface, that is to say with a surface which runs perpendicular to the adjustment axis, or simply with a counterpart body. The angle of inclination of the oblique plane or of the wedge surfaces relative to the plane running perpendicular to the adjustment axis may amount to between a few fractions of one degree and approximately 5°. Greater angles are basically also conceivable.

The conversion device may basically also be refined such that each conversion device has intermeshing threads firstly on one of the walls and secondly on the adjustment shaft and/or on the guide vane.

It may also be provided that each conversion device has a sliding-block guide with firstly a guide slot on one of the walls and secondly a sliding block on the adjustment shaft and/or on the guide vane, or conversely a sliding-block guide with firstly a guide slot on the adjustment shaft and/or the guide vane and secondly a sliding block in each case on one of the walls.

To be able to realize a particularly small guide-vane gap at one of the walls of the ring-shaped gap, it may advantageously also be provided that, in the ring-shaped gap, on at least one of the walls of the ring-shaped gap, in particular on the second wall, there is provided at least one recess into which one or more guide vanes at least partially protrudes as a result of a displacement. A recess of said type may for example be designed so as to be provided as an encircling ring-shaped groove in one of the walls, in particular in the second wall.

It is also conceivable for in each case mutually oppositely situated recesses to be provided in both walls, into which recesses the guide vanes may at least partially protrude, in each case in their extreme positions, in the direction of the adjustment axes.

BRIEF DESCRIPTION OF THE DRAWINGS

Below, the invention will be shown in figures of a drawing, and discussed below, on the basis of exemplary embodiments. In the drawing.

DETAILED DESCRIPTION

Figure 1:
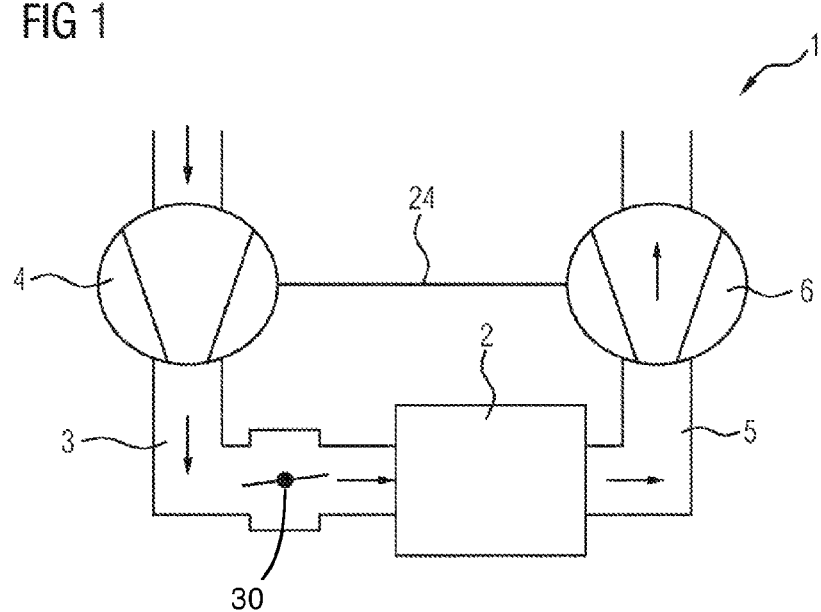
FIG. 1 shows the basic construction of an exhaust-gas turbocharger for an internal combustion engine.

FIG. 1 is a schematic illustration of an exhaust-gas turbocharger 1 which is integrated into an internal combustion engine 2. In the intake duct 3 of the internal combustion engine 2 there is integrated a compressor impeller 4 which permits a pre-compression of the intake air. The compressor impeller 4 is driven by means of a shaft 24, which in turn is fixedly connected to a turbine 6. A throttle valve 30 is located between the impeller 4 and the internal combustion engine 2.

Figure 2:
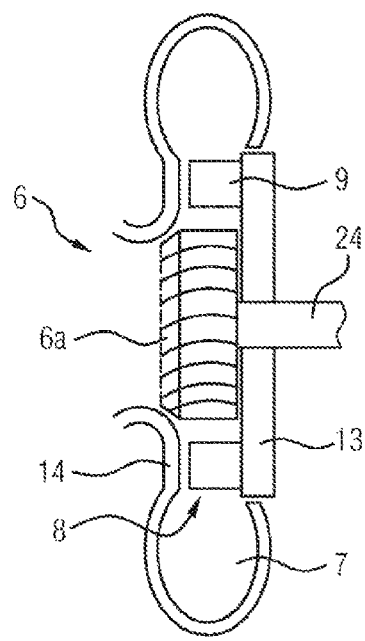
FIG. 2 shows a side view of an exhaust-gas turbine, partially in section.

As can be seen from FIG. 2, the turbine 6 is arranged in the exhaust-gas duct 5 of the internal combustion engine 2 and is driven by the hot combustion gases. Here, the combustion gases are firstly conducted into a spiral housing 7 and are conducted from there circumferentially to a turbine wheel 6a. Here, the exhaust-gas flow passes through a ring-shaped gap 8 which is arranged between the spiral housing 7 and the turbine wheel 6a. The ring-shaped gap 8 extends between the walls 13 and 14 of the turbine housing. In the region of the ring-shaped gap 8, there are arranged positionally fixed guide vanes 9, which are mounted in each case individually in a holding plate 6b, which forms a part of the turbine housing.

Figure 3:
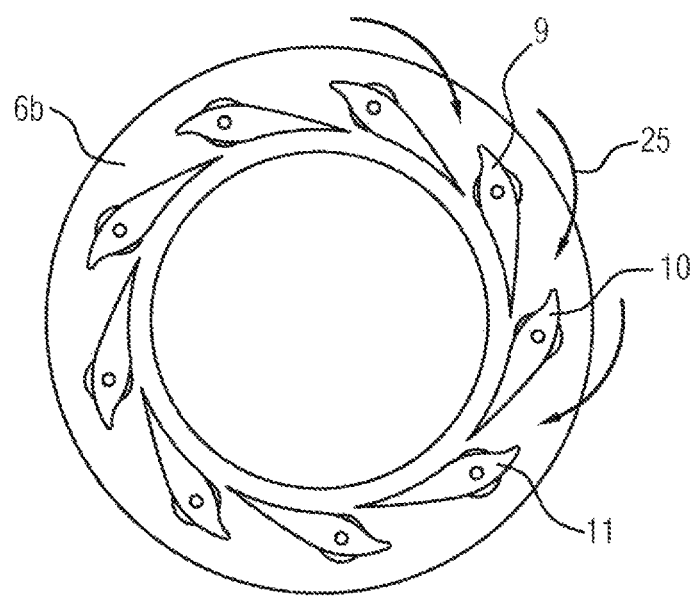
FIG. 3 shows a holding ring with guide vanes in a plan view.

FIG. 3 shows a plan view of the holding plate 6b with guide vanes 9, 10, 11 mounted thereon. The holding plate 6b may form, in sections, a wall 13 of the ring-shaped gap 8. The exhaust-gas flow, illustrated by the arrows 25, flows between the guide vanes circumferentially to the turbine wheel arranged in the center of the holding plate 6b.

Each individual one of the guide vanes 9, 10, 11 may be rotated or pivoted about an axis (adjustment axis), which is perpendicular to the plane of the drawing and to the holding plate 6b, in order to divert the exhaust-gas flow and control the flow resistance in the exhaust-gas duct. For this purpose, each of the guide vanes 9, 10, 11 is connected to an adjustment shaft, which is in each case rotatable about an adjustment axis.

Figure 4:
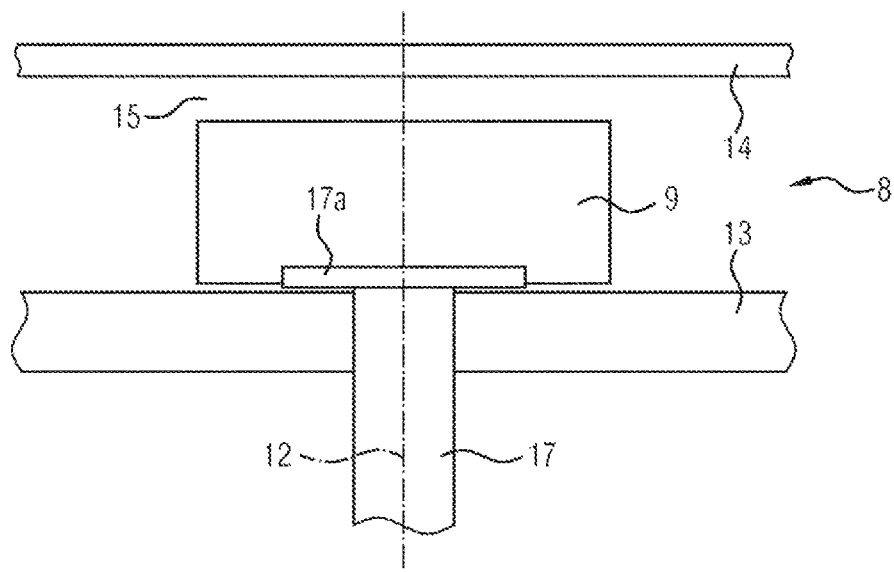
FIG. 4 shows a section through a guide vane having an adjustment mechanism according to the prior art.

In this regard, FIG. 4 shows an arrangement known from the prior art, in the case of which each guide vane 9 is connected to an adjustment shaft 17 in each case via a mounting plate 17a, and is rotatable about the adjustment axes 12. The space in which the guide vanes 9 are arranged is formed as a ring-shaped gap 8 between the walls 13 and 14. Between that side of the guide vane 9 which is averted from the shaft 17 and the second wall 14, there is formed a guide-vane gap 15, which should be kept as small as possible.

Figure 5:
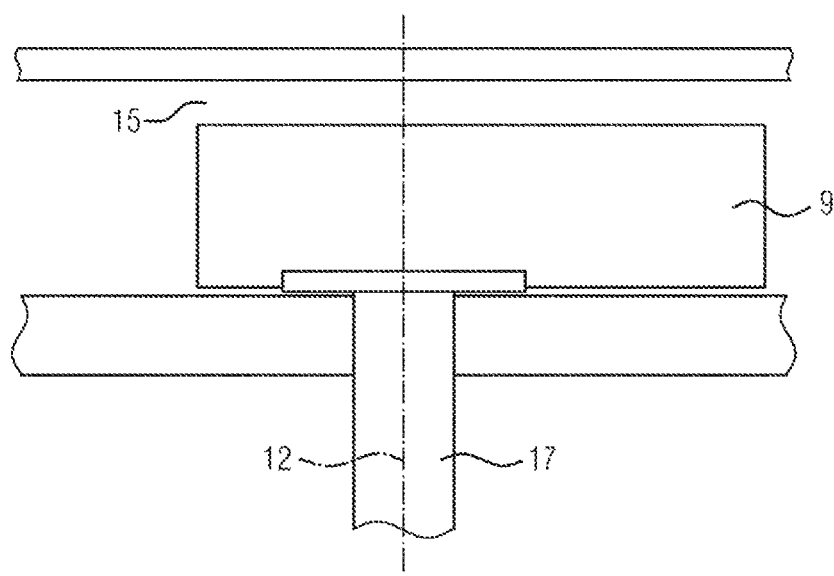
FIG. 5 shows a section through a guide vane having an adjustment mechanism similar to that in FIG. 4 according to the prior art, in a changed adjustment position.

FIG. 5 shows the guide vane 9 from FIG. 4 in a second angular position adjusted relative to the position in FIG. 4. The guide-vane gap 15 is basically unchanged. Normally, two mutually different positions of the guide vane 9, as shown in FIGS. 4 and 5, are provided for different exhaust-gas flows, which also entail different exhaust-gas temperatures. Therefore, in the situations in FIGS. 4 and 5, the guide vane 9 is exposed to different temperatures and is thus thermally expanded to different extents in the direction of the adjustment axis 12 and perpendicular thereto. The guide-vane gap 15 will thus have a different width in the two illustrated situations. The invention serves to provide, for different temperature conditions, a compensation facility by means of a displacement of the guide vanes.

Figure 6:
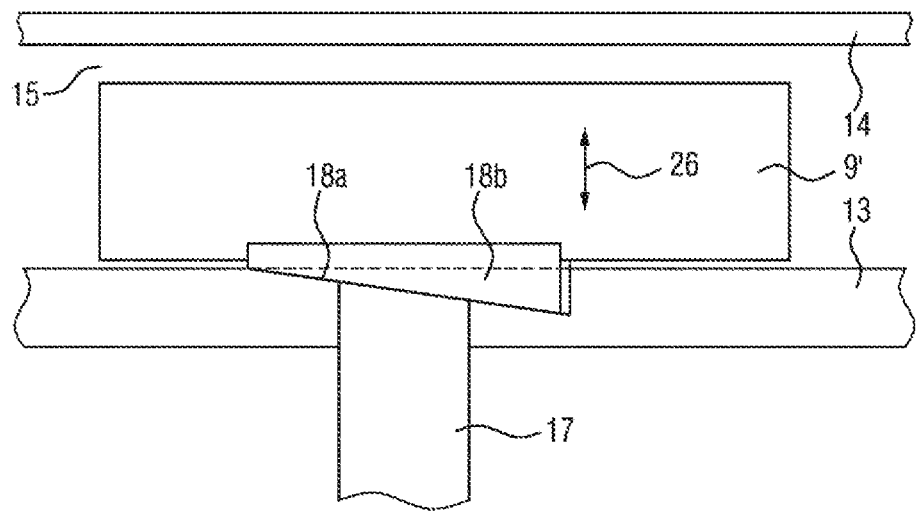
FIG. 6 shows a guide vane having an adjustment mechanism which is coupled to a displacement mechanism, in a first adjustment position.

For this purpose, FIG. 6 shows a conversion device 18a, 18b, which provides an oblique plane 18a in the region of the first wall 13, on which oblique plane a wedge-like body 18b, which is connected to the guide vane 9', slides during the course of the rotation of the adjustment shaft 17. As a result, a displacement of the wedge body 18b and thus also of the guide vane 9' in the direction of the arrow 26 is realized.

Figure 7:
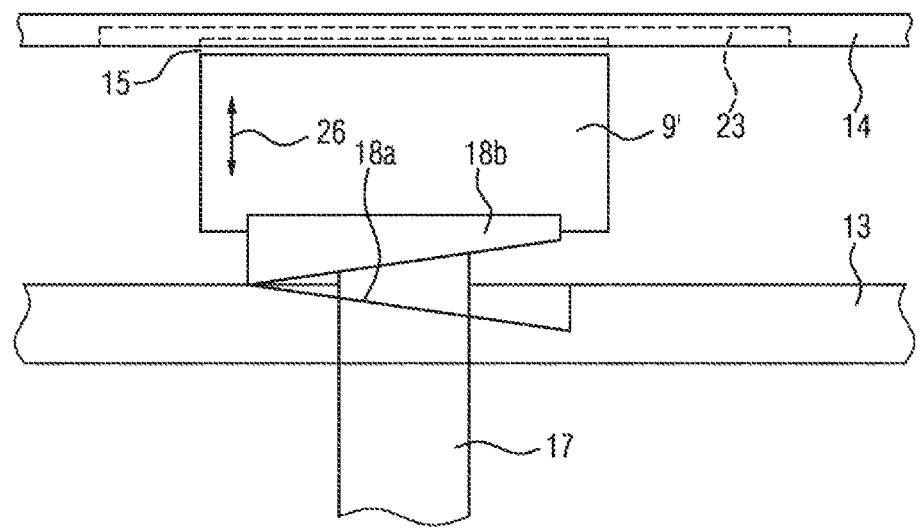
FIG. 7 shows the arrangement from FIG. 6 in a second adjustment position.

FIG. 7 shows a refinement as in FIG. 6, but illustrated with a guide vane 9' having been adjusted in relation to the position in FIG. 6. For example, the position illustrated in FIG. 7 corresponds to a smaller exhaust-gas flow than the position illustrated in FIG. 6, such that the guide vane 9' in FIG. 7, in interaction with the other guide vanes, has been opened. This situation also corresponds to a lower exhaust-gas temperature than the position in FIG. 6, such that the guide vanes exhibit less thermal expansion in relation to the situation in FIG. 6. At the same time as the adjustment by rotation of the adjustment shaft 17, a displacement of the guide vane 9' in the direction of the arrow 26 is also realized in the position in FIG. 7, so as to realize, in FIG. 7, a reduced or at least equal guide-vane gap 15 in relation to FIG. 6.

In FIG. 7, a recess 23 in the second wall 14 is illustrated by dashed lines, which recess may for example be provided as an encircling groove in a ring-shaped holding plate which holds the guide vanes. The guide vanes 9' may, with progressive displacement, protrude into said recess 23 in order to virtually eliminate the guide-vane gap 15 for the exhaust-gas flow.

Figure 8:
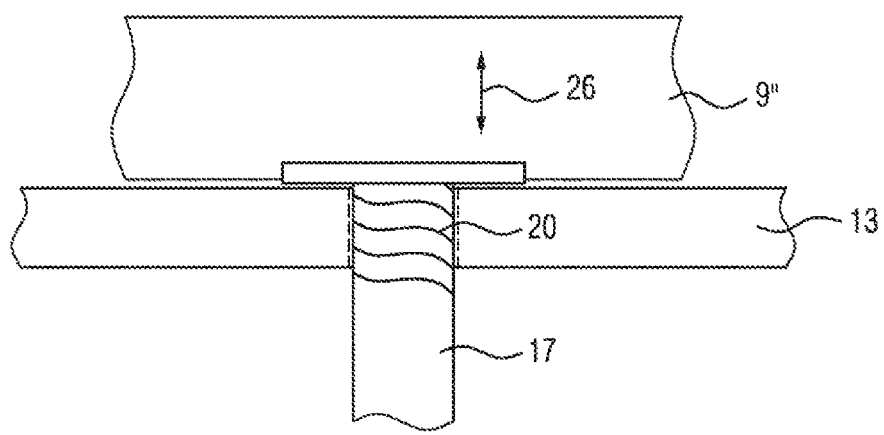
FIG. 8 shows a guide vane having an adjustment device and having a thread as part of the displacement device.

FIG. 8 shows a further conversion mechanism which converts a rotation of the adjustment shaft 17 of a guide vane 9'' into a displacement in the directions of the arrow 26. On the adjustment shaft 17 there is attached an external thread 20, which engages into a thread of the first wall 13. A displacement of the guide vane 9'' in the directions 26 is thus achieved by means of a rotation of the adjustment shaft 17.

Figure 9:
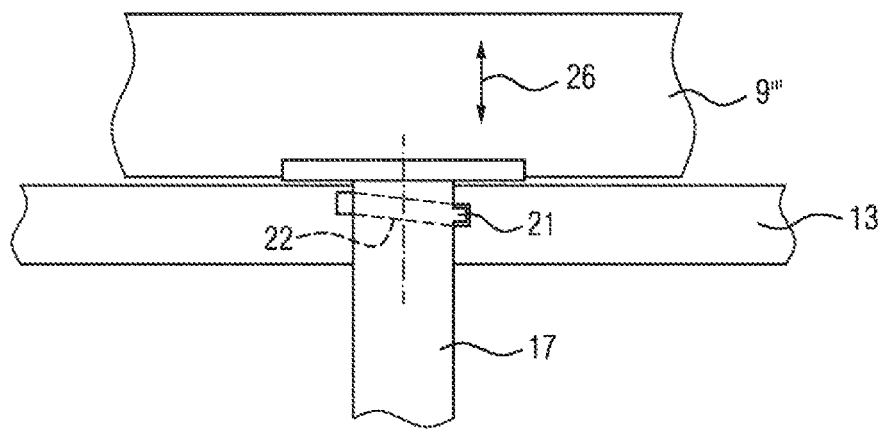
FIG. 9 shows a guide vane having an adjustment device and having a sliding-block device as part of a displacement mechanism.

FIG. 9 shows a further conversion mechanism which acts directly as a displacement device by virtue of a sliding block 21 being fastened to the adjustment shaft 17, which sliding block runs in a guide slot of the first wall 13. The guide slot 22, which, as an encircling groove in a bore in the first wall 13, is oriented obliquely relative to the adjustment axis 12, has the effect that, when the adjustment shaft 17 rotates, said adjustment shaft is moved in the axial direction 26, whereby the guide vane 9''' is also moved correspondingly.

The invention claimed is:

1. An exhaust-gas turbocharger for an internal combustion engine, comprising:
   an intake duct for air,
   an exhaust-gas duct,
   a turbine arranged in the exhaust-gas duct and fixedly connected to a shaft, and
   a compressor impeller arranged in the intake duct and mounted on the shaft;
   a scroll shaped volute housing formed by the exhaust gas duct which coaxially surrounds the turbine;
   guide vanes arranged within a ring-shaped gap disposed between the scroll shaped volute housing and the turbine such that exhaust-gas flow flows circumferentially to the turbine through the ring-shaped gap; and
   an adjustment mechanism rotatable about an adjustment axis and having the guide vanes connected for controlling flow resistance, wherein the adjustment mechanism has a displacement mechanism for displacement of the guide vanes in the ring-shaped gap;
   wherein the displacement mechanism is mechanically coupled to the adjustment mechanism and
   a conversion device for the adjustment mechanism has intermeshing threads firstly on one of the walls and secondly on one or more of the adjustment shaft and on the guide vane.

2. The exhaust-gas turbocharger as claimed in claim 1, wherein the ring-shaped gap is delimited at least in sections by two walls, wherein the guide vanes are mounted, so as to be rotatable about the adjustment axes defined by an adjustment shaft extending through a through-hole in a first wall of the two walls, wherein a guide-vane gap is formed between each of the guide vanes and a second wall of the two walls, which guide-vane gap is adjusted by actuation of the displacement mechanism.

3. The exhaust-gas turbocharger as claimed in claim 1, wherein the displacement mechanism effects a displacement of the guide vanes perpendicularly to a flow direction of the exhaust-gas flow in the ring-shaped gap.

4. The exhaust-gas turbocharger as claimed in claim 1, wherein the adjustment mechanism is connected to the conversion device for converting a rotational movement of each guide vane or of an adjustment shaft connected thereto, about the adjustment axis into a sliding movement in the direction of the adjustment axis, the conversion device forming at least part of the displacement mechanism.

5. The exhaust-gas turbocharger as claimed in claim 4, wherein the conversion device for each guide vane has a sliding-block guide with firstly a guide slot on one of the two walls and secondly a sliding block on one or more of the adjustment shaft and on the guide vane.

6. The exhaust-gas turbocharger as claimed in claim 4, wherein the conversion device for each guide vane includes a sliding-block guide with firstly a guide slot on one or more of the adjustment shaft and the guide vanes and secondly sliding blocks for the conversion device for each guide vane on one of the two walls.

7. The exhaust-gas turbocharger as claimed in claim 1, wherein in the ring-shaped gap at least one recess is disposed on at least one of the two walls which delineate the ring-shaped gap, and wherein one or more guide vanes at least partially protrude into the at least one recess as a result of the displacement.

8. The exhaust-gas turbocharger as claimed in claim 1, wherein in the ring-shaped gap at least one recess is disposed on the second wall which delineates the ring-shaped gap, and wherein one or more guide vanes at least partially protrude into the at least one recess as a result of the displacement.

9. The exhaust-gas turbocharger as claimed in claim 8, wherein the recess comprises an encircling ring-shaped groove in the second wall.

10. An exhaust-gas turbocharger for an internal combustion engine, comprising:
   an intake duct for delivering air;
   an exhaust-gas duct for discharging exhaust gas;
   a turbine arranged in the exhaust-gas duct and fixedly connected to a shaft;
   a compressor impeller arranged in the intake duct and mounted on the shaft;
   a scroll shaped volute housing formed by the exhaust gas duct which coaxially surrounds the turbine;
   guide vanes arranged within a ring-shaped gap disposed between the scroll shaped volute housing and the turbine such that exhaust-gas flow flows circumferentially to the turbine through the ring-shaped gap;
   an adjustment mechanism, for each of the guide vanes, rotatable about an adjustment axis and having the guide vanes connected thereto for controlling flow resistance, wherein the adjustment mechanism has a displacement mechanism for each of the guide vanes for displacement of the guide vanes in the ring-shaped gap;
   wherein the displacement mechanism for each guide vane is mechanically coupled to the adjustment mechanism; and
   a conversion device for the adjustment mechanism for each guide vane comprises two elements in the form of firstly an oblique plane and secondly a counterpart body which slides on the oblique plane during rotational movement, wherein one of the two elements is fastened to the first wall, and a second element of the two elements is fastened to the adjustment shaft or to the guide vane.

11. The exhaust-gas turbocharger as claimed in claim 10, wherein the ring-shaped gap is delimited at least in sections by two walls, wherein the guide vanes are mounted, so as to be rotatable about the adjustment axes defined by an adjustment shaft extending through a through-hole in a first wall of the two walls, wherein a guide-vane gap is formed between each of the guide vanes and a second wall of the two walls, which guide-vane gap is adjusted by actuation of the displacement mechanism.

12. The exhaust-gas turbocharger as claimed in claim 11, wherein the displacement mechanism for each guide vane effects a displacement of the guide vanes perpendicularly to a flow direction of the exhaust-gas flow in the ring-shaped gap.

13. The exhaust-gas turbocharger as claimed in claim 11, wherein in the ring-shaped gap at least one recess is disposed on at least one of the two walls which delineate the ring-shaped gap, and wherein one or more guide vanes at least partially protrude into the at least one recess as a result of the displacement.

14. The exhaust-gas turbocharger as claimed in claim 11, wherein in the ring-shaped gap at least one recess is disposed on the second wall which delineates the ring-shaped gap, and wherein one or more guide vanes at least partially protrude into the at least one recess as a result of the displacement.

15. The exhaust-gas turbocharger as claimed in claim 14, wherein the recess comprises an encircling ring-shaped groove in the second wall.

16. The exhaust-gas turbocharger as claimed in claim 10, wherein the adjustment mechanism for each guide vane is connected to the conversion device for converting a rotational movement of each guide vane or of an adjustment shaft connected thereto, about the adjustment axis into a sliding movement in the direction of the adjustment axis, the conversion device forming at least part of the displacement mechanism.

17. The exhaust-gas turbocharger as claimed in claim 16, wherein the conversion device for the adjustment mechanism for each guide vane has a sliding-block guide with firstly a guide slot on one of the two walls and secondly a sliding block on one or more of the adjustment shaft and on the guide vane.

18. The exhaust-gas turbocharger as claimed in claim 16, wherein the conversion device for the adjustment mechanism for each guide vane includes a sliding-block guide with firstly a guide slot on one or more of the adjustment shaft and the guide vanes and secondly sliding blocks for each conversion device on one of the two walls.

* * * * *